(12) United States Patent
Maillefer et al.

(10) Patent No.: US 6,237,619 B1
(45) Date of Patent: May 29, 2001

(54) MICRO-MACHINED DEVICE FOR FLUIDS AND METHOD OF MANUFACTURE

(75) Inventors: Didier Maillefer, Belmont sur Lausanne; Philippe Renaud, Preverenges, both of (CH)

(73) Assignee: Westonbridge International Limited, Dublin (IE)

( * ) Notice: Subject to any disclaimer, the term of this patent is extended or adjusted under 35 U.S.C. 154(b) by 0 days.

(21) Appl. No.: 09/269,816

(22) PCT Filed: Oct. 1, 1997

(86) PCT No.: PCT/EP97/05550

§ 371 Date: Apr. 1, 1999

§ 102(e) Date: Apr. 1, 1999

(87) PCT Pub. No.: WO98/14707

PCT Pub. Date: Apr. 9, 1998

(30) Foreign Application Priority Data

Oct. 3, 1996 (FR) .................................................. 96 12054

(51) Int. Cl.[7] .............................. C23F 1/00; F16K 15/14; F04B 43/14
(52) U.S. Cl. .................................. 137/15.18; 251/129.01; 251/368; 137/859; 216/2
(58) Field of Search ............................. 257/129.01, 331, 257/368; 137/859, 15.18; 216/2

(56) References Cited

U.S. PATENT DOCUMENTS

| 5,050,838 | | 9/1991 | Beatty et al. |
|---|---|---|---|
| 5,078,581 | * | 1/1992 | Blum et al. ............................ 417/322 |
| 5,224,843 | * | 7/1993 | Van Lintel ............................ 417/413 |
| 5,259,737 | * | 11/1993 | Kamisuki et al. ..................... 417/322 |
| 5,362,213 | * | 11/1994 | Komatsu et al. ..................... 417/418 |
| 5,417,235 | * | 5/1995 | Wise et al. ........................ 251/129.01 |
| 5,488,255 | * | 1/1996 | Sato et al. ............................. 257/718 |
| 5,529,465 | * | 6/1996 | Zengerle et al. .................. 417/413.2 |
| 5,725,117 | * | 3/1998 | Elsberry et al. ....................... 137/519 |

FOREIGN PATENT DOCUMENTS

| 2 354 249 | 11/1974 | (DE) . |
|---|---|---|
| 0 412 270 A1 | 6/1991 | (EP) . |
| 0 546 427 A1 | 6/1993 | (EP) . |
| 0 601 516 A1 | 6/1994 | (EP) . |
| 1418274 | 12/1975 | (GB) . |
| WO 95/19502 | 7/1995 | (WO) . |

OTHER PUBLICATIONS

Kohl: "Development of Microactuators Based On the Shape Memory Effect", Supplement of Journal de Physique III, pp. 1187–1192, vol. 5, No. 12, Dec. 1995.

Rapp et al.: "Liga Micropump for Gases and Liquids", Sensors and Actuators, pp. 57–61, vol. A40, No. 1, Jan. 1, 1994.

* cited by examiner

Primary Examiner—Joseph A. Kaufman
Assistant Examiner—Eric Keasel
(74) Attorney, Agent, or Firm—Wolf, Greenfield & Sacks, P.C.

(57) ABSTRACT

The invention relates to a micro-machined fluid-flow device (10) comprising a substrate (12) possessing a flow duct (14), a deformable thin layer (18) such a pump membrane or a valve-forming membrane. According to the invention, the thin layer (18) is a rolled metal sheet, preferably made of titanium, and connected to the substrate (12) in the zone (20) overlapping the flow duct, by an anodic bonding. The invention is applicable to making a valve.

7 Claims, 2 Drawing Sheets

MICRO-MACHINED DEVICE FOR FLUIDS AND METHOD OF MANUFACTURE

FIELD OF THE INVENTION

The present invention relates to a micro-machined fluid-flow device and to a method of manufacturing it, said device comprising a substrate possessing a flow duct and a thin layer forming a deformable membrane.

By way of example, such a device constitutes a member for controlling liquid inlet/outlet which can be used as a check valve or in a micropump.

BACKGROUND OF THE INVENTION

Valves of this type are encountered, for example but not exclusively, in micropumps for medical use which deliver a regular and controlled quantity of medication. The manufacture of micropumps is based on the technologies of micro-machining silicon and of using a piezo-electric actuator. International patent application PCT IB 95/00028 describes a self-priming micropump. In that application, as in others, it is necessary to make an inlet valve and sometimes an outlet valve so that the leakage rate is minimized or even zero. The leakage rate from a valve corresponds to the rate at which liquid flows through the valve when the membrane is in its rest position, i.e. when the valve is closed. Furthermore, since the valve operates because of the elasticity of the membrane, with this elasticity allowing the membrane to deform when fluid is injected to the inlet of the valve at sufficient pressure, it is important not to degrade the mass and surface state of the membrane when manufacturing the valve in order to obtain a membrane that presents a minimum amount of internal stress.

The object of the present invention is to provide a machined liquid inlet/outlet device having a minimum leakage rate in the closed position of the valve and in which the method of manufacture leads to a membrane having good physical and mechanical properties with little internal stress.

When the problem arises of covering a substrate with a thin metal layer, various methods can be used. The thin metal layer can be deposited on the substrate by evaporation, or by the cathode sputtering technique. Nevertheless, those methods have certain limitations.

Usually, metal layers that have been deposited have physical properties that are less good than those of the same materials in solid form. Thus, the layer is usually obtained with considerable amounts of internal stress, particularly because of the crystal structure of the deposited layer which is very sensitive to deposition conditions. Furthermore, a deposited thin layer is of a thickness that is limited to about 1 micrometer, since greater thicknesses cause the method to become too expensive because the time required to make the deposit is too long.

Another possibility consists in depositing the metal layer electrolytically, which technique does not suffer from all of the above-mentioned drawbacks. Nevertheless, it is not possible to deposit all materials, and in particular metals, by that method, and the physical and mechanical properties of the deposited layer are often insufficient.

SUMMARY OF THE INVENTION

According to the invention, these objects are achieved by the fact that the thin layer, e.g. forming a deformable membrane, is a rolled metal sheet, preferably connected to the substrate in the overlap zone by the anodic bonding technique. According to the invention, the method of manufacturing a micro-machined fluid-flow device is characterized in that it comprises the following steps:

a substrate is provided that possesses a flow duct;

a sacrificial layer is deposited on the substrate by physico-chemical means;

zones of the sacrificial layer that are to give rise to a membrane which is not attached to the substrate are conserved by photolithography and chemical etching;

a deformable thin layer constituted by a metal sheet is made by rolling;

the thin layer is placed on the substrate;

said thin layer is connected to the zones of the substrate that are not covered by the sacrificial layer by means of a physico-chemical method;

said thin layer is machined by photolithography and chemical etching after it has been fixed on the substrate; and the sacrificial layer is again etched, thereby releasing the membrane from the substrate.

Thus, according to the invention, a rolled metal sheet is used that can be connected to a substrate and can then be machined again to make microstructures. The advantages that stem from this invention are, in particular, physical and mechanical properties of the metal after rolling that are excellent and well-controlled. Thus, the stresses present in the metal are low, with the final stress state of the membrane resulting mainly from the method of bonding the membrane to the substrate.

Another advantage of the present invention is the possibility of fixing the sheet on a cavity of the substrate, thus making it possible to make a membrane or a bridge directly without any etching step.

Another important aspect of the present invention is the use of anodic bonding for fixing the sheet on the substrate. The prior art has never disclosed the use of that technique for metal sheets.

The anodic bonding technique is known per se and consists in raising the temperature of the parts that are to be assembled together, i.e. the substrate and the membrane, to about 300° C., and in placing the stack between two electrodes that are in contact with the substrate and with the membrane while applying a negative potential of about—1000 V to the electrode which is pressed against the substrate. A leakproof weld is thus obtained at relatively low temperature between the membrane and the substrate.

By using a rolled metal sheet, it is possible for the metal sheet that is subsequently to serve as a membrane in the valve or the micropump to be of a thickness that is fixed in very accurate manner and over a range of values that is quite large.

In the present text, the term "rolled sheet" is used to mean a sheet obtained by a metal-working method in which the sheet is obtained by successive passes between rolls.

BRIEF DESCRIPTION OF THE DRAWINGS

The invention will be better understood and secondary characteristics and advantages thereof will appear on reading the description of embodiments given below by way of example.

Naturally, the description and the drawings are given purely by way of non-limiting indication. Reference is made to the accompanying drawings, in which.

DETAILED DESCRIPTION OF THE INVENTION

Figure 1:
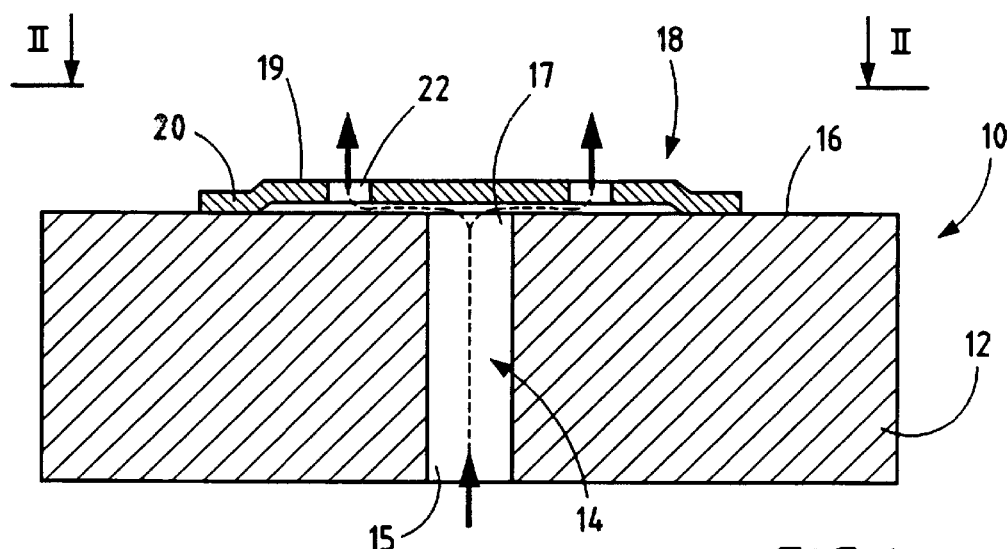
FIG. 1 is a diagrammatic section view of a first embodiment of a micro-machined valve of the invention.

In the first embodiment of the invention, the micromachined valve 10 constitutes a check valve. This valve 10 comprises a substrate 12, e.g. of "PYREX" type of glass which possesses flow duct 14. The outlet of the flow duct 14 opens out in the top surface 16 of the substrate 12. The membrane 18, e.g. a sheet of rolled titanium of thickness lying in the range 2 micrometers ($\mu$m) to 10 $\mu$m, covers the outlet orifice of the duct 14 and is fixed to the top surface 16 of the substrate by a peripheral zone 20. The membrane 18 forms a thin disk having at least one flow orifice 22 disposed in a zone of the membrane that surrounds the outlet orifice of the flow duct 14 so that when the membrane 18 is in its rest position, the duct 14 and the orifices 22 cannot communicate with one another.

Figure 2:
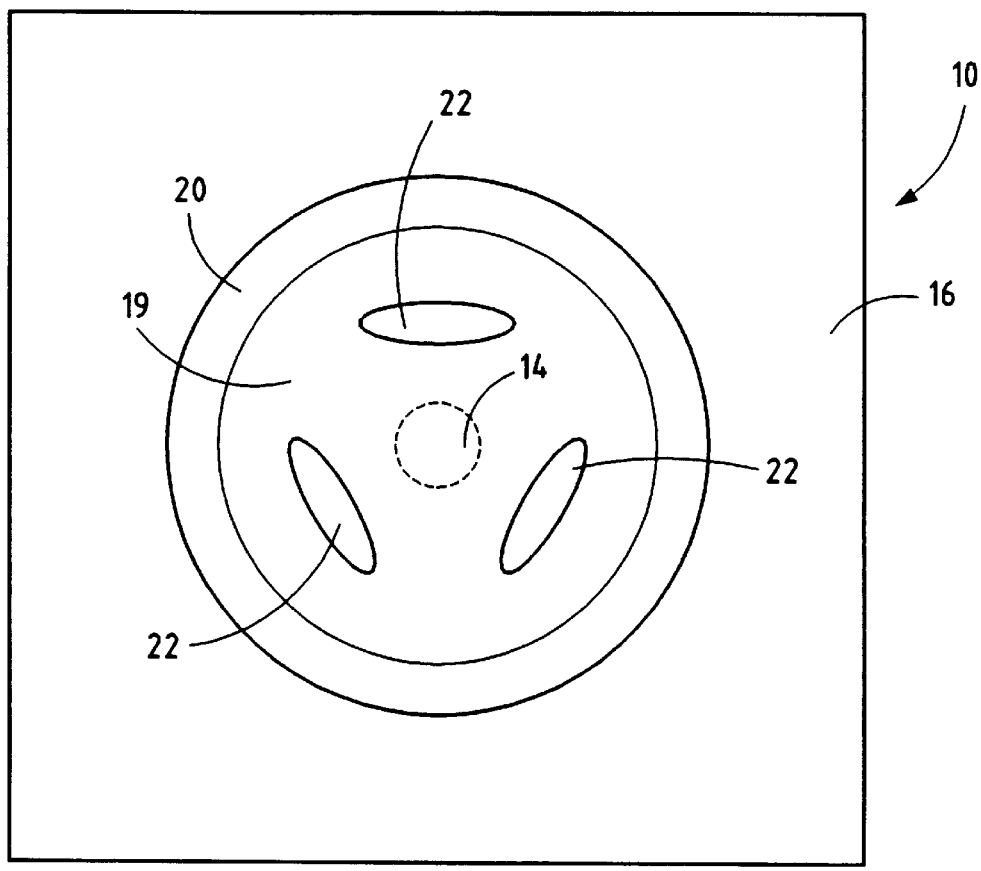
FIG. 2 is a view of the FIG. 1 valve in direction II—II of FIG. 1, i.e. from above the valve.

As can be seen in FIG. 2, the flow orifices 22 through the membrane 18 can, for example, be oval in shape and can be distributed at equal distances apart from one another in the central zone 19 of the membrane and on a circle that is concentric about the outlet orifice of the duct 14. The central zone 19 of the membrane 18 having the orifices 22 is thus not fixed to the substrate.

When fluid arrives at sufficient pressure via the inlet orifice of the flow duct 14, this liquid pressure reaches the central zone 19 of the membrane 18 which then deforms elastically by curving, while the periphery 20 of the membrane 18 remains fixed to the substrate 12. The deformation of the membrane 18 establishes a space between the membrane and the substrate 12 so that the liquid can penetrate via said space and through the flow orifices 22 of the membrane 18 (arrows in FIG. 1): this is the open position of the valve 10.

Operation of such a valve thus requires the peripheral zone 20 of the membrane 18 to be fixed in permanent manner on the substrate 12, it requires the membrane 18 to be capable of moving away from the substrate 12 in the central zone 19 of the membrane, and it requires the flow duct 14 through the substrate and the orifices 22 through the membrane to be in a relative position such that they do not communicate with one another when the valve is in its rest or closed position because they are relatively offset, while they are able to communicate with one another when the valve is in its open position in order to allow the liquid to flow from the duct 14 through the orifices 22.

The method of manufacturing such a membrane valve is described below. The flow duct 14 is pierced through the substrate 12, e.g. a "PYREX" wafer, e.g. by ultrasound drilling to a diameter of about 0.1 mm. A thin sacrificial layer of aluminum is deposited on the top surface 16 of the substrate 12 surrounding the outlet orifice of the duct 14, said sacrificial layer being made by evaporation and having a thickness of about 0.1 $\mu$m. The outline of the aluminum layer is rectified by photolithography and by etching using a standard solution for attacking aluminum. The rolled titanium sheet 18 is fixed to the glass substrate by anodic bonding between the peripheral zone 20 of the titanium sheet and the top surface 16 of the glass substrate 12, the central zone 19 of the titanium sheet being over the sacrificial layer of aluminum. The outline of the titanium sheet is rectified by photolithography and etching using a solution of diluted hydrofluoric acid. During the last step of the method of manufacturing the valve, the sacrificial layer of aluminum is completely removed or dissolved by a standard aluminum-etching solution.

Thus, a valve is obtained in which the active element, i.e. the membrane, is practically free from any internal stress, thereby enabling it to present better mechanical performance, such as better resistance to deformation or fatigue, and better resistance to chemical corrosion.

After the sacrificial layer has been dissolved, the central layer 19 of the membrane 18 is thus not fixed in any way to the substrate 12.

A second embodiment is described below with reference to FIG. 3 which shows a valve 30 of the kind that can be found in a micropump, e.g. a micropump as described in the above-specified international patent application.

In this embodiment, the valve 30 comprises a substrate 32, e.g. of glass, a flexible membrane 38, and a plate 44, e.g. of silicon. As can be seen in FIG. 3, a flow duct 34 passes through the substrate 32, having an inlet orifice 35 placed in the top portion of the duct 34 in FIG. 3 which is obstructed by the membrane 38. This membrane, e.g. a sheet of rolled metal and preferably of titanium, is fixed to the planar surface 36 of the glass substrate 32 adjacent to the inlet orifice 35 of the flow duct 34 of the substrate. The membrane 38 has a central zone 39 in register with the flow duct 34, and an annular zone 40 fixed to the surface 36 of the glass substrate 32.

An orifice 42 passes through the membrane 38, preferably in the center of the central zone 39 of the membrane 38 so that the orifice 42 is in line with the flow duct 34 of the substrate 32 and preferably on the axis of the duct 34.

The silicon plate 44 is also fixed to the planar surface 36 of the glass substrate 32, beside the inlet orifice 35 of the flow duct 34. The face of the silicon plate 44 which is in register with the membrane 38 is not entirely planar, but has a contact surface 45 connected to the surface 36 of the substrate 32 away from the membrane 38.

The zone of the plate 44 which is in register with the membrane 38 is shaped so as to form a chamber 46 in which liquid can flow. Provision is made for this chamber 46 which is situated between the substrate 32 and the silicon plate 44 to extend beyond the zone of the micropump shown in FIG. 3 and constituting the valve 30 of the present invention, towards liquid inlet means.

Figure 3:
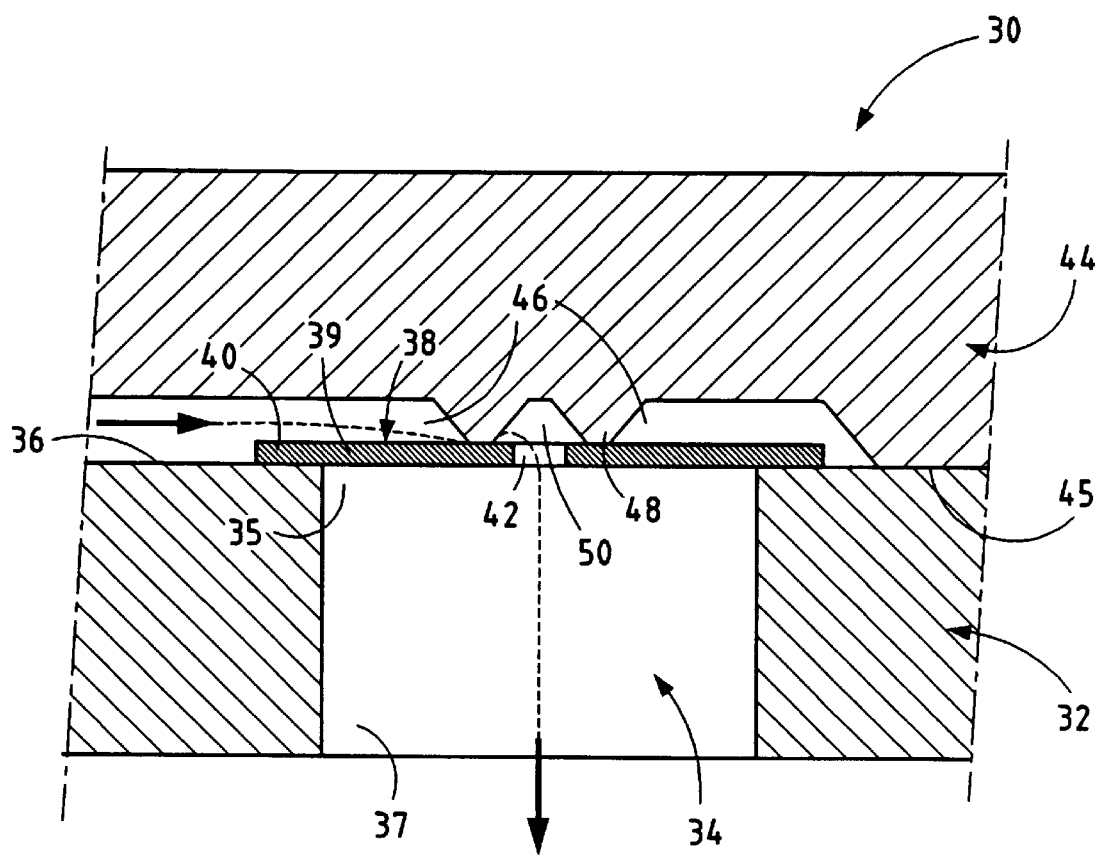
FIG. 3 is a diagrammatic section view of a second embodiment of a valve of the present invention, suitable for integration in a micropump.

The zone of the plate 44 situated in register with the orifice 42 of the membrane 38 has an annular projection 48 whose cross-section as shown in FIG. 3 appears as two tapering quadrilaterals. The inside space within the projection 48 is likewise tapering and constitutes the space 50 which is in line with and in register with the orifice 42 in the membrane 38 and with the flow duct 34 in the glass substrate 32.

Provision is made for the free end of the annular projection 48 to be in contact with the central zone 39 of the membrane 38 around the orifice 42 when the valve 30 is in its rest position. Thus, when the valve 30 is in its rest position, the annular projection 48 constitutes an obstacle to the flow of liquid between the chamber 46 adjacent to the silicon plate 44 and the flow duct 34 of the glass substrate. When the valve 30 is in operation, the pressure of the liquid contained in the chamber 46 increases, thereby deforming the central zone 39 of the elastic membrane 38 downwards from the disposition shown in FIG. 3, thereby spacing the membrane 38 away from the free end of the projection 48, and thus allowing liquid to flow from the chamber 46 towards the space 50, and then from the chamber 50 through the orifice 42 in the deformed flexible membrane 38 into the flow duct 34.

When all of the liquid coming from the liquid inlet means situated upstream from the chamber 46 has flowed via the space 50 and the orifice 42 into the flow duct 34 towards another compartment of the micropump, the pressure in the chamber 46 decreases, and because of its elasticity the membrane 38 returns to its initial position, i.e. it comes back into contact with the free end of the annular projection 48 so that the chamber 46 and the flow duct 34 are no longer in liquid communication with each other.

The valve 30 thus acts as a check valve since because of the above-described configuration, if liquid contained in the flow duct 34 of the substrate 32 is subjected to an increase of pressure, deformation of the membrane 38 will not allow said liquid to pass via the orifice 42 and the space 50 towards the chamber 46 because the free end of the projection 48 remains in contact with the membrane 38, preventing it from deforming.

In this second embodiment, the annular projection 48 from the silicon plate serves as a valve seat for the membrane 38 which presses against the projection 48. The periphery 40 of the membrane 38 is preferably fixed to the surface 36 of the substrate 32 by anodic bonding, and the same applies to the bond between the surface 45 of the silicon plate 44 and the surface 36 of the glass substrate 32.

The valve 30 forms a check valve operating in the opposite direction to the valve 10 described above. For the valve 30, manufacture differs from that of the valve 10 in that there is no need to use a sacrificial layer prior to fixing the membrane on the substrate.

In FIG. 3, it will be observed that the flow duct 34 is of transverse size that is greater than that of the orifice 42 in the membrane 38, so the flow duct 34 constitutes a cavity.

Figure 4:
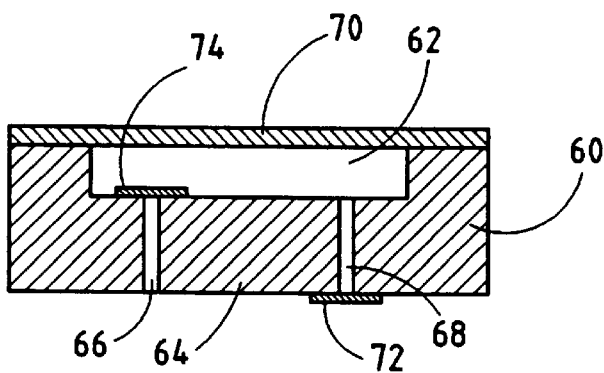
FIG. 4 shows how a micropump of the invention can be embodied.

FIG. 4 shows how the invention can be applied to making a micropump. The pump has a wall 60 that is made, for example, of silicon and that defines an internal cavity 62. The bottom 64 of the micropump body is pierced by two orifices 66 and 68 respectively for fluid inlet and outlet relative to the inside of the cavity 62. The top portion of the cavity 62 is closed by a deformable membrane 70, preferably made of titanium using the above-described method. The periphery of this membrane is fixed as described above. The body 60 of the micropump acts as the substrate. The orifices 66 and 68 are fitted respectively internally and externally with respective deformable membranes 74 and 72 acting as check valves as defined in the description above.

Other, alternative embodiments can come within the ambit of the invention. Thus, the substrate can be made not only of glass, preferably a borosilicate glass of "PYREX" or other type, but also of silicon or of ceramic or indeed of other materials that match the thermal expansion coefficient of the metal used. Corning, Inc., of Corning, N.Y., is the owner of the PYREX trademark. Other fixing techniques can also be used to fix the sheet on the substrate, such as adhesive, soldering, a silicon combination (Ti Si, Pt Si, . . . ), or making a eutetic (e.g. Au Si).

Because the rolled metal sheet conserves physical and mechanical properties close to those of a solid material, it is possible to use the rolled sheet in an electromagnetic actuator or sensor with a membrane that then possesses magnetic properties that are much better than it would possess if it had been made by deposition; metal sheets made using shape memory alloy can also constitute another alternative embodiment.

Other materials can be suitable for the metal sheet: platinum, iridium, aluminum or chromium, tantalum, niobium, molybdenum, or indeed stainless steel alloys such as Fe—Ni ferro—nickels. Nevertheless, it seems that titanium is the metal that lends itself best to anodic bonding. In addition, titanium has the mechanical and chemical properties that are most suitable for the intended use. Furthermore, it withstands corrosion well and can easily be machined by chemical etching.

What is claimed is:

1. A method of manufacturing a micro-machined device for a device containing a fluid, the method comprising the following steps:

providing a substrate that possesses a flow duct;

depositing a sacrificial layer on the substrate by physico-chemical means;

conserving zones of the sacrificial layer that are to give rise to a membrane which is not attached to the substrate by photolithography and chemical etching;

rolling a deformable thin layer formed of a metal sheet;

placing the thin layer on the substrate;

connecting said thin layer to the zones of the substrate that are not covered by the sacrificial layer by means of a physico-chemical method;

machining said thin layer by photolithography and chemical etching after it has been fixed on the substrate; and etching again the sacrificial layer, thereby releasing the membrane from the substrate.

2. The method according to claim 1, wherein said physico-chemical method is anodic bonding.

3. The method according to claim 1, wherein said membrane is of a thickness lying in the range of about 2 $\mu$m to 10 $\mu$m.

4. The method according to claim 1, wherein said membrane is made of a material selected from the group consisting of: platinum, iridium, aluminum, chromium, tantalum, niobium, molybdenum, and stainless steel alloys, including Fe—Ni.

5. The method according to claim 1, wherein said substrate is made of silicon.

6. The method according to claim 1, wherein said thin layer is made of titanium.

7. The method according to claim 6, wherein said substrate is made of glass.

* * * * *